3,034,862
METHOD FOR PREPARING PYROPHOSPHORYL CHLORIDE

Arthur Dock Fon Toy, Park Forest, and Julian E. Blanch, Tinley Park, Ill., assignors to Stauffer Chemical Company, New York, N.Y., a corporation of Delaware
No Drawing. Filed July 27, 1960, Ser. No. 45,560
9 Claims. (Cl. 23—203)

The present invention is directed to a new method for preparing pyrophosphoryl chloride. More specifically, it is directed to a method for preparing pyrophosphoryl chloride by reaction between phosphoryl chloride and an alkoxy phosphoryl dichloride.

Pyrophosphoryl chloride ($P_2O_3Cl_4$) is a well-known chemical principally used as an intermediate in the synthesis of organic phosphorus-containing compounds. Heretofore, its preparation has been the subject of considerable investigation in an attempt to find more economical methods of preparation and to improve the yields in the known methods. For some of the better known prior art methods see Berichte der deutschen chemischen Gesellschraft, vol. 4, p. 766 (1871), and Zeitschrift für anorganische und allgemeine Chemie, vol. 298, pp. 156–163 (1959).

The prior art methods of preparing pyrophosphoryl chloride include (1) the free radical reaction of $N_2O_4$ or $N_2O_3$ with $PCl_3$, (2) the low temperature (0° C.) hydrolysis of $P(O)Cl_3$, and (3) the high temperature (200° C.) reaction between $P(O)Cl_3$ and $P_2O_5$. A common disadvantage of all these methods lies in the poor yields (10–30% of theory) that are obtained. For example, the first method mentioned above has the disadvantages of using expensive starting materials and producing a reported yield of only about 17% of pyrophosphoryl chloride.

We have now found that phosphoryl chloride and an alkoxy phosphoryl dichloride can be reacted at elevated temperatures to give pyrophosphoryl chloride in yields far in excess of any of the methods known heretofore. By a preferred method of the present invention, yields at least as high as 70% (based on the predicted theoretical stoichiometric yield) of a high purity pyrophosphoryl chloride are possible.

The following equations serve to illustrate the alternate methods for proceeding from the starting reactants by the present invention:

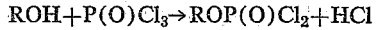

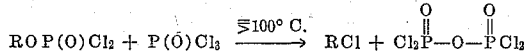

wherein R is a lower alkyl group such as methyl, ethyl, propyl, amyl, and octyl. However, because the higher members of said group are more susceptable to decomposition at the relatively high temperatures of the present invention and therefore are consistant with lower yields, it is preferable to use the lower members such as methyl, ethyl, and propyl.

In practice we have performed the synthesis by a two step procedure in which the alkoxy phosphoryl dichloride was isolated by distillation prior to the second reaction and also by a one step procedure represented by a summation of the two reactions. The first equation above represents a well known liquid phase reaction which proceeds rapidly even at temperatures as low as about 3° C. to produce a high yield of alkoxy phosphoryl dischloride which is sufficiently heat stable to be vaporized from a refluxing mixture containing $P(O)Cl_3$. The second reaction represents the basis for the present invention and may be accomplished in either the liquid or vapor phase. For a vapor phase reaction the reactants shown in the second equation are passed through a hot zone where they are heated to at least about 100° C., but below the temperature at which appreciable decomposition will occur.

A continuous one step vapor phase process may be conducted by adding the alkyl alcohol to an excess of phosphoryl chloride at a rate sufficient to produce the desired quantity of alkoxy phosphoryl dichloride while volatilizing the solution so formed to generate a vapor phase capable of reacting according to the second equation shown above. This vapor phase is passed through a heated zone after which the vaporous pyrophosphoryl chloride produced may be removed from the vaporous mixture by fractional condensation. Moreover, continuous production of pyrophosphoryl chloride may be accomplished by various modifications of the method of this invention, indirectly from the alkyl alcohol and phosphoryl chloride reactants or directly from the alkoxy phosphoryl dichloride and phosphoryl chloride reactants.

Because $ROP(O)Cl_2$ is somewhat unstable at high temperatures over long periods of time, and because high temperatures (of at least about 100° C.) are necessary to drive the pyrophosphoryl chloride forming reaction to the right, it is preferable to operate in the vapor phase where the reactants are heated for not more than a few seconds and are stable even at very high temperatures during a short heating period. Nevertheless, solutions of $ROP(O)Cl_2$ and $P(O)Cl_3$ may be reacted at temperatures of at least 100° C. but usually in excess of the normal boiling points of such solutions (under superatmospheric pressure) to give appreciable quantities of pyrophosphoryl chloride.

An important variable in the synthesis of pyrophosphoryl chloride is the molecular ratio of $POCl_3$ to $ROP(O)Cl_2$ in the reaction zone. The following table shows the effects of varying this ratio in a mixture consisting of methoxy phosphoryl dichloride and phosphoryl chloride in a vapor phase reaction.

TABLE I

| Experiment | $POCl_3/CH_3OP(O)Cl_2$ | | Yield, percent | Vapor Phase Reaction Temperature, °C. | Total Heating Time, Hrs. |
|---|---|---|---|---|---|
| | Liquid | Vapor | | | |
| A | 5:1 | 31:1 | 70 | 300 | 72 |
| B | 5:1 | 31:1 | 64 | 300 | 72 |
| C | 5:1 | 31:1 | 51 | 250 | 72 |
| D | 2:1 | 12:1 | 41 | 200 | 24 |
| E | 2:1 | 12:1 | 39 | 300 | 24 |
| F | 1.1:1 | 6:1 | <25 | 250 | 24 |
| G | 0.73:1 | 4:1 | <25 | 200 | 24 |

The results shown in Table I were obtained from vapor phase reactions conducted in the manner described in Examples 1–3 below. It may be observed from the above table that an increase in the $POCl_3$ to $CH_3OP(O)Cl_2$ ratio results in an increased yield. For example, experiments D and E showed yields of 41% and 39%, respectively, at ratios of 2:1, while experiment G showed a yield of less than 25% at a ratio of 0.73:1.

Although we do not wish to be bound to any specific theory in the explanation of the present findings, it appears that both temperature and the ratio of the reactants have a rather definite effect upon the reaction. At low ratios the concentration of $ROP(O)Cl_2$ in the vapor is quite high. Thus, more of this compound is held at an elevated temperature permitting greater decomposition by inter and intra molecular elimination of RCL to form $(PO_2Cl)_x$. In addition, the lower the concentration of $P(O)Cl_3$ the more likelihood there is for reaction between alkoxy phosphoryl dichloride and any pyrophosphoryl chloride product. At higher ratios $P(O)Cl_3$ acts as a diluent in the reaction zone to prevent collision between $ROP(O)Cl_2$ and $P_2O_3Cl_4$ molecules. It may be concluded that the higher the ratio of $P(O)Cl_3$ to $ROP(O)Cl_2$ the longer the time necessary to produce isolatable quantities of $P_2O_3Cl_4$ because of the small amount of $ROP(O)Cl_2$ present at any one instant. However, this same high concentration of $P(O)Cl_3$ prevents the formation of large quantities of undesirable products. At very high ratios, for example above about 65:1 in the vapor, the time necessary to accumulate practical amounts of $P_2O_3Cl_4$ is prohibitively long even though slightly higher percentage yields can be expected. When using $P(O)Cl_3$ to $ROP(O)Cl_2$ ratios on the low side, for example below about 3:1, great quantities of undesirable products are formed even though the reaction time is decreased appreciably. In other words, it may be said generally that, at any fixed reaction temperature, as the ratio is increased the reaction rate decreases and the yield increases. Consistent with the above considerations, the preferred feed ratios in the vapor phase are within the range of about 18–50 to 1. At ratios above 65:1 or below 3:1 some reaction is possible but either the high yields or rapid rates of the preferred ratios are not present. The preferred reaction time in the vapor phase is below a few seconds. Reaction has been observed in the vapor phase when the reactants have been retained at high temperature for an extremely short period of time, estimated at about 0.05 second. Retention of the vapors at high temperatures for periods as long as 4—10 seconds is practicable.

Temperature, or more specifically a combination of temperature and retention time, have an important effect upon the vapor phase reaction. At higher temperatures the reaction rate is increased but so is the rate of formation of side products. The vaporous materials cannot be held at elevated temperatures for long without appreciable decomposition, even at temperatures as low as about 250° C. Overheating can produce a reaction between alkoxy phosphoryl dichloride reactant and the pyrophosphoryl chloride product with the formation of polyphosphoryl chlorides, an undesirable contaminant in the present invention. But for short periods of time (in the range of a few seconds), the vapors can be heated to very high temperatures well in excess of their decomposition point without appreciably increasing decomposition or the formation of side products. Because of this, the vapors are heated quickly to high temperatures, preferably within the range of about 250°–400° C., and cooled rapidly thereafter by passage through a condenser or equivalent means. By the vapor phase method there is no specific upper temperature limitation but rather a limitation as to the energy which may be imparted to the vapor phase during a short interval of time. In a liquid phase reaction conducted at a uniform constant boiling temperature the upper temperature limitation is clearly determined to be at the point where appreciable decomposition of the reactants and products becomes excessive, about 250° C.

The following specific examples will further illustrate the method of the invention.

*Example 1*

A laboratory reactor was constructed from rather standard articles of laboratory glassware and other easily obtained apparatus. This reactor consisted of three major pieces of apparatus joined together by glass conduits. A vertical arrangement was used (i. e., the units were placed at different elevations) to furnish gravity flow of liquids formed by condensation of vapors in the upper most unit back to the liquid reservoir in the lowest unit. In the order of their higher elevation the three units were a one l. round bottom flask with a glass thermometer well containing an ordinary mercury thermometer, a second round flask with a silica-tube shielded Nichrome heating element extending into the interior and located in approximately the center of the said flask, and a water cooled glass condenser vented to the atmosphere through a drying tube containing calcium chloride. The one l. flask at the bottom of the reactor served as a reservoir for the liquids to be volatilized and was heated externally by an electric heating mantle. The flask containing the Nichrome heating element acted as a vapor phase heating zone for the vapors emanating from the liquid phase boiling in the flask below. Near the top of the uppermost flask was connected the condenser. The vapors passing into the vapor phase heating zone would leave that zone through the condenser where they would be liquified and would return by gravity flow to the lower flask.

Before conducting the synthesis of pyrophosphoryl chloride the Nichrome heating element was calibrated. This element was connected to a 110 v. power source through a Variac. With the reactor empty a thermocouple was inserted through the condenser and the hot junction pressed firmly against the silica-tube shield of the Nichrome heating element. The cold junction was connected to a continuous recording Micromax. The voltage in the heater was gradually increased in 20 v. increments from 20 v. to 100 v. A plot of temperature vs. Variac setting was made and used for determining the temperature in all future experiments with this apparatus.

A solution of 148 grams (1 mol) of $CH_3OP(O)Cl_2$ in 765 grams (5 mol) of $P(O)Cl_3$ was placed in the lower flask of the reactor described above. The heating mantle was turned on to raise the temperature of the solution in the lower flask. The silica tube in the upper flask was heated to a calibrated temperature of 300° C. The solution was then brought to a very vigorous boil which gave a solution temperature of 110°–115° C. The vapors generated in the lower flask passed into the upper flask over the surface of the hot tube and into the condenser where they condensed and ran down a cooler inner surface of the upper flask back to the lower flask. By such a process it was possible to continuously recycle unreacted $P(O)Cl_3$ and $CH_3OP(O)Cl_2$ into the hot zone (vapor reactor) and at the same time return the very much higher boiling, but somewhat heat sensitive $P_2O_3Cl_4$ to the relatively cooler lower flask from which it did not again vaporize. The initial composition of the vapor as it entered the hot tube was approximately 97 mol percent $P(O)Cl_3$ and 3 mol percent $CH_3OP(O)Cl_2$, as determined by refractive index measurements of condensed vapors. The reaction was run continuously for 72 hours at the end of which time the somewhat darkened (by decomposition materials and side products) reaction mixture was again weighed to determine the loss during reaction. The crude reaction mixture was then distilled directly from the lower reaction vessel by attaching it to a vacuum distillation apparatus. Upon completion of the distillation the weight of residue remaining was determined. Samples of all fractions and the residue were collected and analyzed. It was determined that after subtracting the unreacted $CH_3OP(O)Cl_2$, 70% of the reacted product was pyrophosphoryl chloride with the remaining 30% composed of decomposition products and polyphosphoryl chlorides.

*Example 2*

This example shows the method of preparing the methoxy phosphoryl dichloride intermediate.

Seven hundred and sixty-seven grams (5 mols) of $P(O)Cl_3$ was placed in a four-necked, two liter reaction flask equipped with an air tight mechanical stirrer, reflux condenser (with a drying tube at the open end), thermometer, and dropping funnel. All joints were fitted with glass unions. The $P(O)Cl_3$ was cooled in an ice water bath to 10° C. and 107 grams (3.3 mol) of $CH_3OH$ was added dropwise thereto while stirring at a rate such that the temperature did not rise above 15° C. After the addition was complete, the reaction was allowed to come to room temperature. The reaction mixture was distilled under reduced pressure and the fraction boiling at 72° C. at 33 mm. Hg was collected as $CH_3P(O)Cl_2$ product. Analysis showed a yield of 354 g. (72% of theoretical) of material with a refractive index $N_D^{25}$ = 1.4327 to 1.4318.

In other experiments $CH_3OP(O)Cl_2$ was reacted directly in the vapor state without being isolated from its reaction mixture. For such procedure it was necessary to add one mol of $P(O)Cl_3$, in excess of the amount selected for the liquid phase, for each mol of $CH_3OH$ added to the reaction mixture. Thus for a 5:1 ratio in the liquid it was necessary to add 6 mols of $POCl_3$ for each mol of $CH_3OH$.

*Example 3*

A simple laboratory reactor was constructed for this example. The function of this apparatus was to heat a vapor mixture of $P(O)Cl_3$ and $CH_3P(O)Cl_2$ for a few seconds at a uniform high temperature, rather than under a temperature gradient as was the case in Example 1.

A one l. round bottom flask was fitted at its top opening with a vertical one inch diameter glass packed reaction tube extending above the flask for about 2 feet. To the top of this tube was connected a glass conduit for carrying vapor to a vertical water-cooled condenser mounted at the same elevation as the reaction tube. From the bottom of the condenser a glass conduit was connected for returning condensed liquids back to the flask. A reflux condenser vented through a drying tube to the atmosphere was connected at a T joint included in the glass conduit joining the reaction tube and the vertical condenser. A tube furnace was mounted around the outside of the reaction tube and a thermocouple was mounted within the tube to control the temperature of the said furnace.

To the one l. flask a solution containing 236 grams (1.5 mol) of $P(O)Cl_3$ and 148 grams (1 mol) of $CH_3OP(O)Cl_2$ was added. The tube furnace was turned on and the temperature inside the reaction tube was stabilized at 400° C. A heating mantle was placed under the flask and was used to bring the solution therein to a vigorous boil. Vapor passed out of the flask, ascended through the 400° C. reaction tube, and then was condensed and returned to the flask. The procedure was continued for 48 hours at which time the material contained in the flask was analyzed. The reacted material was found to contain 33.4% $P_2O_3Cl_4$. A comparison of the yield with those shown for a similar feed ratio in Table I (compiled mainly from experiments conducted with the apparatus of Example 1) seems to indicate that there is no appreciable advantage in maintaining the reaction zone under isothermal high temperature conditions.

*Example 4*

A solution consisting of 230 grams of $P(O)Cl_3$, 74.5 grams of $CH_3OP(O)Cl_2$ and 2 drops of pyridine was placed in a 500 ml. flask equipped with a reflux condenser. The solution was heated to boiling, 110°–112° C., and refluxed for a period of 6 hours. The contents of the flask were analyzed and found to contain a 17% (theoretical) yield of pyrophosphoryl chloride.

Many advantages are found in the present method of preparing pyrophosphoryl chloride. Yields at least about twice those of the prior art methods are possible from inexpensive and readily available starting materials. For the purposes of the present reaction the starting materials are easily purified to an acceptable degree. By-products of the reaction are gases and are easily recovered or disposed of. The intermediate $ROP(O)Cl_2$ is easily prepared in high yield and is sufficiently heat stable to be vaporized from a refluxing solution of $P(O)Cl_3$ (or reacted directly in the solution), and its vapor repeatedly heated to high temperatures for a few seconds.

The vaporous reactants may be generated separately and thereafter mixed and contacted in the reaction zone, or they may be generated from a boiling solution having the proper ratio of $P(O)Cl_3$ to $CH_3OP(O)Cl_2$ in the liquid phase to produce the desired ratio of reactants in the vapor phase. In either case the reacted vapor mixture may be separated into its components by fractional condensation or other well known means and/or it may be recycled through the reaction zone.

The foregoing detailed description has been given for clearness of understanding only, and no unnecessary limitations should be understood therefrom, as modifications will be obvious to those skilled in the art.

What we claim is:

1. A method of preparing pyrophosphoryl chloride which comprises reacting phosphoryl chloride with a lower alkoxy phosphoryl dichloride at a temperature of at least 100° C., the amount of said phosphoryl chloride reactant employed being at least about 3 moles per mole of said lower alkoxy phosphoryl dichloride reactant employed, recovering the resulting reaction mixture, and separating said pyrophosphoryl chloride from said reaction mixture.

2. The method of claim 1 wherein the lower alkoxy phosphoryl dichloride is methoxy phosphoryl dichloride.

3. A method of preparing pyrophosphoryl chloride which comprises heating an intimate mixture of vaporous phosphoryl chloride and a vaporous lower alkoxy phosphoryl dichloride, said mixture containing a molecular ratio of said phosphoryl chloride to said lower alkoxy phosphoryl dichloride within the range of 3:1 to 65:1, to a temperature of at least 100° C. for a time sufficient to cause the vapors to react to form pyrophosphoryl chloride, recovering the resulting reaction mixture, and separating said pyrophosphoryl chloride from said reaction mixture.

4. The method of claim 3 wherein the lower alkoxy phosphoryl dichloride is methoxy phosphoryl dichloride.

5. The method of claim 3 wherein the molecular ratio of phosphoryl chloride to lower alkoxy phosphoryl dichloride is within the range of 18:1 to 50:1 and the vapors are heated to a temperature within the range of 250°–400° C.

6. A method of continuously preparing pyrophosphoryl chloride which comprises passing an intimate mixture of vaporous phosphoryl chloride and a vaporous lower alkoxy phosphoryl dichloride, said mixture containing a molecular ratio of said phosphoryl chloride to said lower alkoxy phosphoryl dichloride within the range of 3:1 to 65:1, through a heated zone wherein said mixture is heated to a temperature of at least 100° C. for a time sufficient to effect a reaction with the formation of pyrophosphoryl chloride, and thereafter separating from the resulting vapor phase pyrophosphoryl chloride and higher boiling reaction products and recycling the vapor remaining after separation through the heated zone together with a sufficient make-up stream of phosphoryl chloride and lower alkoxy phosphoryl dichloride to maintain the desired ratio of vapors in the said heated zone.

7. The method of claim 6 wherein the lower alkoxy phosphoryl dichloride is methoxy phosphoryl dichloride.

8. A method of preparing pyrophosphoryl chloride which comprises reacting a liquid lower alkoxy phosphoryl dichloride with liquid phosphoryl chloride at a temperature within the range of 100° C. to about 250° C., the amount of said phosphoryl chloride reactant employed being at least about 3 moles per mole of said lower alkoxy phosphoryl dichloride reactant employed, recovering the resulting reacting mixture, and separating said pyrophosphoryl chloride from said reaction mixture.

9. The method of claim 8 wherein the lower alkoxy phosphoryl dichloride is methoxy phosphoryl dichloride.

References Cited in the file of this patent

J. W. Mellor's "A Comprehensive Treatise on Inorganic and Theoretical Chemistry," vol. 8, 1928 ed., pages 1026 and 1027; Longmans, Green and Co., New York.